United States Patent [19]

Burbank

[11] 4,248,069
[45] Feb. 3, 1981

[54] APPARATUS FOR PROTECTING AND PREVENTING THEFT OF IN-DASHBOARD MOUNTED RADIOS AND THE LIKE

[76] Inventor: Fred H. Burbank, 770 Welch Rd.-Suite 335, Palo Alto, Calif. 94304

[21] Appl. No.: 956,594

[22] Filed: Nov. 1, 1978

[51] Int. Cl.³ .............................................. B65D 55/14
[52] U.S. Cl. ...................................... 70/160; 70/258; 455/345
[58] Field of Search ................................. 70/159–164, 70/166–169, 258; 455/90, 345, 347–345

[56] References Cited

U.S. PATENT DOCUMENTS

| 2,716,882 | 9/1955 | Gill et al. ................................. 70/159 |
| 3,096,409 | 7/1963 | Hubbell et al. ...................... 70/161 X |
| 4,058,994 | 11/1977 | Coppola ............................. 70/159 X |

FOREIGN PATENT DOCUMENTS 1442147  5/1966  France ........................................ 70/160

Primary Examiner—William E. Lyddane
Attorney, Agent, or Firm—Flehr, Hohbach, Test, Albritton & Herbert

[57] ABSTRACT

Apparatus for protecting and preventing theft of in-dashboard mounted vehicle radios and the like is shown wherein the locking apparatus is attached by means of the very same threaded shafts which are utilized as the primary mounting means of the radio instrument itself. The threaded mounting shafts of the radio instrument secure a backing plate to the face of the dashboard and a cover is removably connected to the back plate in such a manner that it may be locked over the mounting shafts as well as the operable portions of the instrument.

4 Claims, 4 Drawing Figures

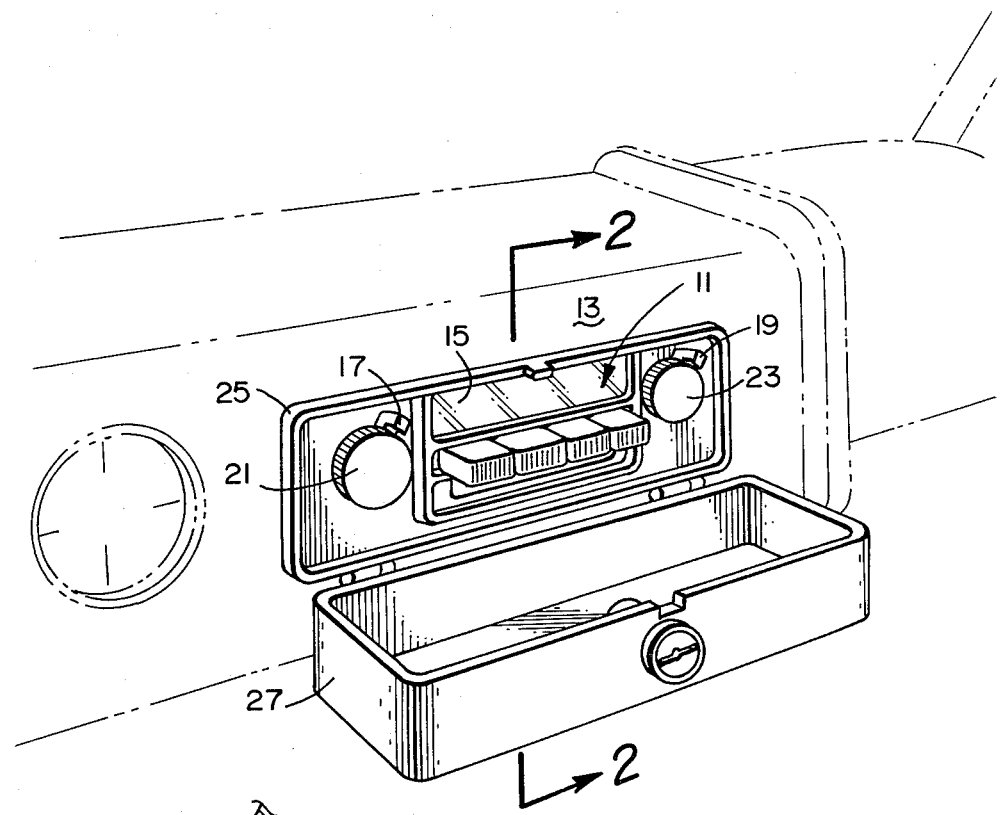
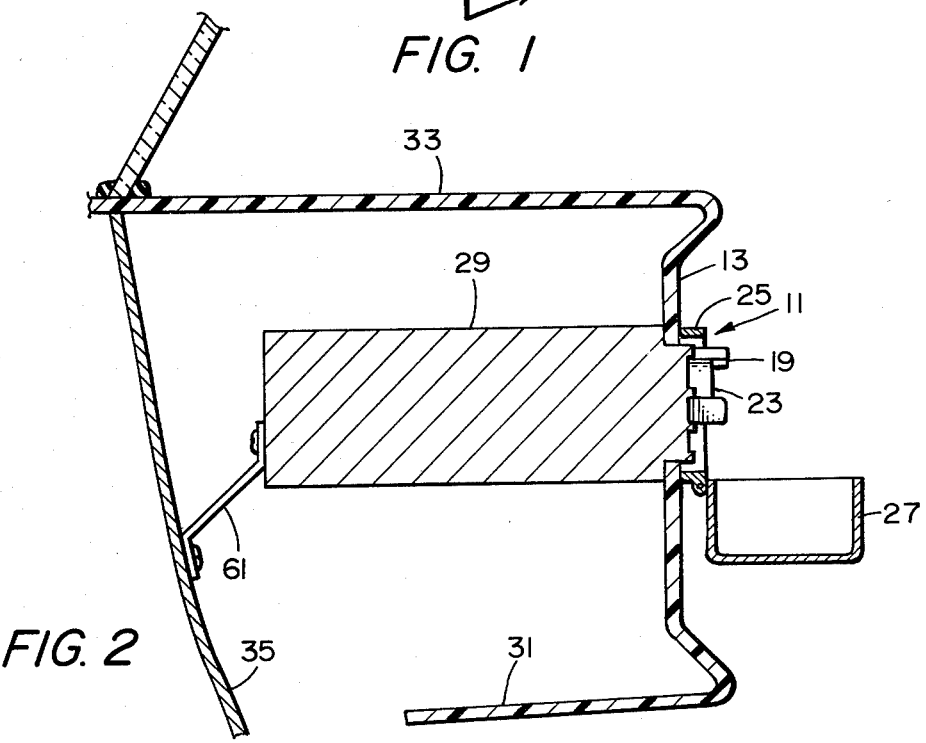

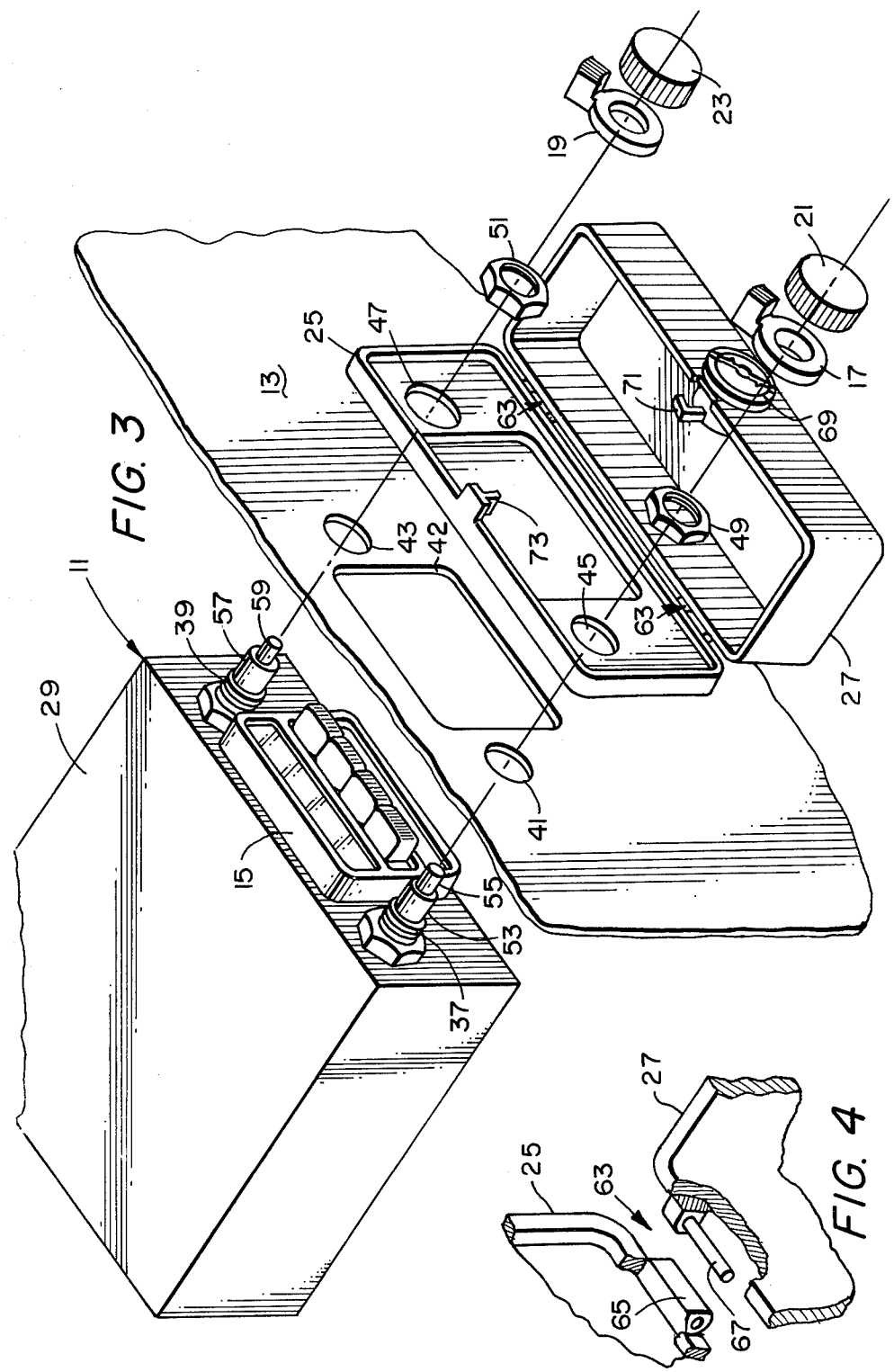

APPARATUS FOR PROTECTING AND PREVENTING THEFT OF IN-DASHBOARD MOUNTED RADIOS AND THE LIKE

The present invention relates to security apparatus in general and, in particular, to locking apparatus for preventing unauthorized use of, damage to, or theft of in-dashboard mounted vehicle radios or similar instruments. Vehicles, of course, may include not only automobiles but also trucks, boats, airplanes, motorcycles, snowmobiles, mobile homes and the like. Such instruments may include not only amplitude or frequency modulated receivers but also citizens band transceivers as well as tape decks, or any combination of these devices. The instruments to be protected in accordance with the invention include a relatively large body mounted on the back side of the dashboard, a nose portion extending or at least accessible through an opening in the dashboard, and a pair of control shafts which extend through an associated pair of threaded mounting shafts which themselves extend through the dashboard and, with cooperating nuts, serve as the primary means of mounting the instrument to the dashboard.

While the time honored control shaft mounting of such radios and similar instruments provides ease of mounting as well as quick and simple access to the units for repair, the system also makes the instrument subject to easy theft.

In view of the foregoing a principal object of the present invention is to provide an apparatus not only to prevent or greatly reduce the possibility of theft but also to prevent the unauthorized use of or damage to an in-dashboard mounted radio or the like. In general, apparatus in accordance with the present invention includes a back plate which can be mounted across the face of the dashboard by means of the same threaded mounting shaft which are employed for the radio instrument itself. The back plate includes an opening for the viewing and/or manipulation of various elements on the nose portion of the mounted instrument, openings for the threaded mounting shafts, together with means for receiving and locking a cover. The cover is constructed to shield the nose portion of the instrument from use and at the same time shields from access the nuts associated with the threaded mounting shafts.

Referring to the drawing,

FIG. 1 is a perspective view of a locking apparatus in accordance with the invention;

FIG. 2 is a cross sectional view taken along the line 2—2 of FIG. 1;

FIG. 3 is an exploded perspective view showing the manner of mounting the locking apparatus as well as the radio to the dashboard of a vehicle, and FIG. 4 is a detailed exploded perspective view showing the construction of a hinge in accordance with one embodiment of the invention.

Referring to FIG. 1 there is shown a combination AM/FM radio and tape cassette deck 11 mounted in the dashboard 13 of an automobile. As shown particularly in FIG. 1 the only portions of the instruments which are visible from the front of the dashboard is the nose 15 and control knobs 17, 19, 21 and 23. Locking apparatus in accordance with the invention is mounted on the front of dashboard 13 and includes a back plate 25 and a cover 27 which, in the embodiment shown, is hingably connected to the back plate 25.

As can be seen in FIG. 2, the body 29 of the instrument is by far the largest portion of it and is mounted behind the dashboard where it is relatively inaccessible by reason of its being surrounded generally by the dashboard 13 itself, the under dash 31, the dash top 33 and the fire wall 35. The body 29 is made further inaccessible by reason of the general inclusion of other apparatus, meters, gauges and wires located behind the dashboard 13.

Referring now particularly to FIG. 3, the manner of mounting the radio instrument as well as the locking apparatus in accordance with the invention can be seen. The body 29 of the radio instrument includes not only the aforementioned nose portion 15 which passes through aperture 42 but also a pair of hollow threaded shafts 37 and 39 which are disposed to pass through apertures 41 and 43 respectively in the dashboard 13. The shafts 37 and 39 likewise pass through apertures 45 and 47 in the back plate 25 of the locking apparatus. Mounting nuts 49 and 51 cooperate with the shafts 37 and 39 to draw the body 29 tightly against the back of the dashboard 13 and at the same time draw the back plate 25 tightly against the front of the dashboard.

In some dashboards, there exists a single large aperture and there is provided a retaining plate (not shown) which is larger in dimension than the single large aperture. In the retaining plate there are provided apertures similar to apertures 41, 42 and 43. Such a retaining plate then functions as the dashboard 13 with its apertures 41, 42 and 43. Other mounting variations exist and such variations are readily apparent to those skilled in the art and are inconsequential to the present invention.

As shown in FIG. 3, control knobs 17 and 21 are mounted on concentric shafts 53 and 55 which extend through the threaded shaft 37 and similarly control knobs 19 and 23 are attached to the concentric shafts 57 and 59. Such an arrangement is usual whether the mounting is as shown in FIG. 3 or some alternative thereof such as with the aforementioned retaining plate.

Thus it can be seen that the shafts 37 and 39 provide the primary means of mounting the radio instrument in the dashboard but, as can be particularly seen in FIG. 2, there may be an auxiliary mounting means such as a support strap 61 connected between the body 29 and fire wall 35 or other portion of the automobile.

In the particular embodiment shown and as specifically seen in FIG. 3, the locking apparatus includes cover 27 which is connected to the back plate 25 by means of hinges 63 which, as may be seen more clearly in FIG. 4, may comprise sleeves 65 attached to the back plate 25 and pins 67 attached to the cover 27. Thus, it can be seen that while the cover 27 is hingedly connected, it may be removed by sliding the pins 67 from the sleeves 65. Other forms of connection such as fixed hinges, dovetails, wedges and the like will become readily apparent to those skilled in the art. It should also be noted that the cover 27 carries a lock 69 having a tang 71 which cooperates with an opening 73 in the back plate 25 to lock the cover 27 in place when so desired by the operator. Although the lock 69 is shown to a key, it is readily apparent that combination or other forms of locks may be substituted.

It can be readily seen that when it is desired to use the radio instrument, the cover 27 can be opened as shown in FIG. 1, or in fact can be completely removed and placed out of sight. On the other hand, when it is intended to leave the automobile and to protect the radio instrument, the cover 27 may be raised and the lock 69 operated to secure the cover over the nose portion as well as the control knobs of the instrument. By covering the control knobs it is readily apparent that the nuts 49 and 51 are also covered so as to severely impede any attempted theft of the instrument. Moreover, the use of the cover 27 over the nose portion of the instrument prevents use of the instrument itself and more importantly prevents the possibility of tampering with the device such as might occur by vandals attempting to destroy the tape deck with a screw driver or a similar instrument.

Thus it is seen that an improved locking apparatus for in-dashboard mounted automobile radio instruments and the like has been provided. The apparatus may be added to existing radio instruments and the like or may very well be made a part of new instruments.

I claim:

1. Apparatus for protecting and preventing theft of a radio instrument and the like adapted to be mounted in a dashboard; said dashboard having a relatively accessible front side and a relatively inaccessible back side, the combination comprising: an instrument to be protected including a body adapted to be positioned in back of the dashboard, a nose portion adapted to be visable from the front of the dashboard, a pair of hollow threaded shafts adapted to also extend through said dashboard, a pair of instrument control shafts extending through said hollow threaded shafts, a pair of nuts carried by said hollow threaded shafts on the front side of said dashboard for releasably drawing said body tightly against the back side of said dashboard, and control knobs attached to said control shafts; and protection means including a back plate defining an opening corresponding in size and position to said nose piece and a pair of apertures corresponding in size and position to said pair of hollow threaded shafts, said back plate being adapted to be secured between the front of said dashboard and said nuts whereby said back plate is retained in position by the same threaded hollow shafts and nuts as retain said instrument in position, cover means attached to said back plate for selectively enclosing and exposing said nose portion, said nuts, and said control knobs and means for locking cover means to said back plate in its position enclosing said nose portion, said nuts and said control knobs.

2. Apparatus as defined in claim 1 wherein said cover means is removably attached to said back plate.

3. Apparatus as defined in claim 1 wherein said cover means is hingedly attached to said back plate.

4. Apparatus as defined in claim 1 wherein said cover means is removably and hingedly attached to said back plate.

* * * * *